United States Patent [19]

Land et al.

[11] 4,184,756
[45] Jan. 22, 1980

[54] STROBE WITHOUT PRIMARY STORAGE CAPACITOR

[75] Inventors: Edwin H. Land, Cambridge; Conrad H. Biber, Needham, both of Mass.

[73] Assignee: Polaroid Corporation, Cambridge, Mass.

[21] Appl. No.: 951,120

[22] Filed: Oct. 13, 1978

[51] Int. Cl.² .................... G03B 7/16; G03B 15/03
[52] U.S. Cl. .................................. 354/33; 354/145
[58] Field of Search ............... 354/33, 35, 139, 145, 354/149

[56] References Cited

U.S. PATENT DOCUMENTS

| | | | |
|---|---|---|---|
| 2,531,220 | 11/1950 | Kaplan | 315/219 |
| 2,722,629 | 11/1935 | Germeshausen | 315/163 |
| 2,724,792 | 11/1955 | Nessel | 315/234 |
| 2,983,850 | 5/1961 | Edgerton | 315/241 |
| 3,146,391 | 8/1964 | Walker | 320/1 |
| 3,288,044 | 11/1966 | Bramer | 354/149 UX |
| 3,421,944 | 1/1969 | Bauer | 136/6 |
| 3,475,651 | 10/1969 | Harding et al. | 315/242 |
| 3,563,805 | 2/1971 | Deierhol | 136/111 |
| 3,617,387 | 11/1971 | Grulke et al. | 136/111 |
| 3,734,780 | 5/1973 | Bilhorn et al. | 136/111 |
| 3,770,504 | 11/1973 | Bergum | 136/10 |
| 3,791,278 | 2/1974 | Biber et al. | 95/53 EA |
| 3,820,128 | 6/1974 | Burgarella et al. | 354/149 X |
| 3,846,811 | 11/1974 | Nakamura et al. | 354/145 |
| 3,858,227 | 12/1974 | Ellin et al. | 354/145 |
| 3,976,914 | 8/1976 | McConnell | 354/145 X |
| 3,993,929 | 11/1976 | Dick et al. | 354/33 X |
| 4,062,027 | 12/1977 | Miyazaki et al. | 354/35 X |
| 4,064,519 | 12/1977 | Kee | 354/145 X |
| 4,074,295 | 2/1978 | Kee | 354/145 |
| 4,119,770 | 10/1978 | Land | 429/152 |

*Primary Examiner*—Donald A. Griffin
*Attorney, Agent, or Firm*—Edward S. Roman

[57] ABSTRACT

An electronic flash device is powered from a high voltage, low internal impedance battery which may be connected directly across a flash discharge tube to provide a flash discharge current through the tube without the use of a primary storage capacitor.

7 Claims, 2 Drawing Figures

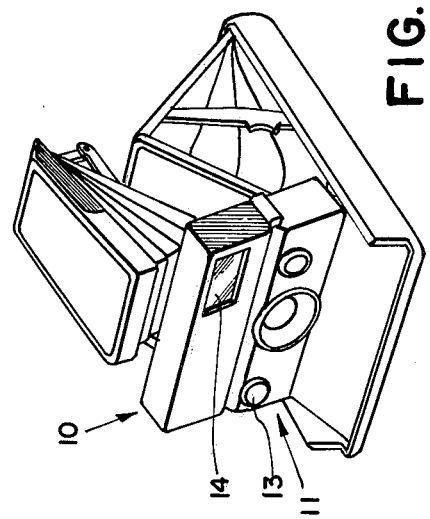
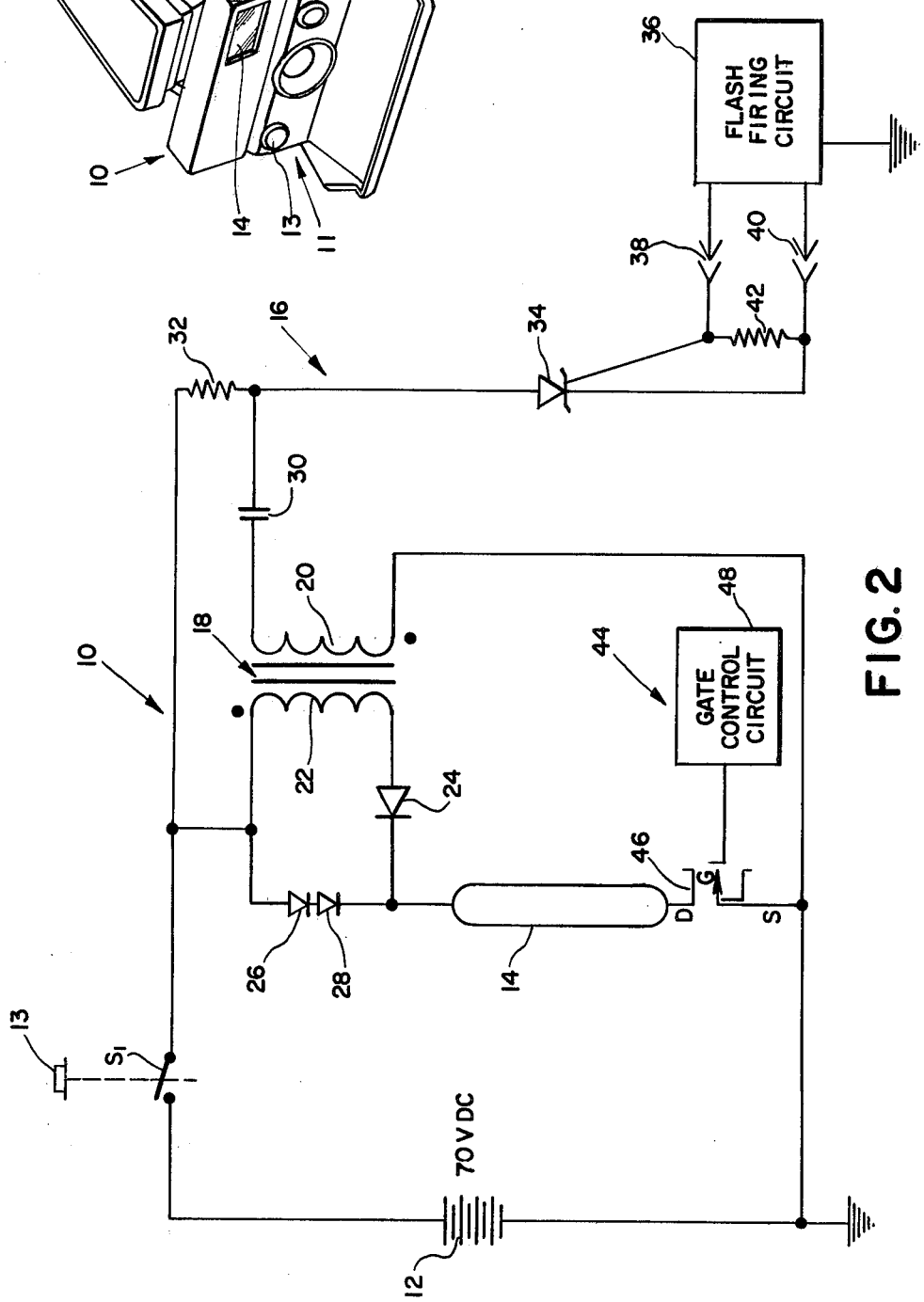

STROBE WITHOUT PRIMARY STORAGE CAPACITOR

CROSS REFERENCE TO RELATED PATENT APPLICATION

This invention relates to U.S. patent application Ser. No. 930,863, entitled "Fast Charging Electronic Flash Device" by E. Land et al., filed in common assignment herewith.

BACKGROUND OF THE INVENTION

1. Field of the Invention

This invention relates to an electronic flash device wherein the discharge current is provided to the flash tube directly from a battery and, more particularly, to an electronic flash device which does not include a primary storage capacitor and which instead operates to discharge current through a flash tube directly from a battery.

2. Description of the Prior Art

The Polaroid SX-70 Land camera made and sold by the Polaroid Corporation, Cambridge, Mass., U.S.A. is adapted to make photographs automatically either by ambient light or by the aid of a flash lamp array. It is highly desirable to extend the capabilities of the Polaroid SX-70 Land Camera and other such cameras as the new Polaroid Pronto! Camera for use with electronic flash. One type of electronic flash device or strobe particularly suitable for use with Polaroid's SX-70 Land Camera as disclosed in U.S. Pat. No. 4,074,295, entitled "Compact Accessory Strobe for Cameras with Battery Enclosed Film Pack," by R. Kee, issued Feb. 14, 1978, is directed to a compact strobe which is powered directly from the camera by way of a battery located within a film cassette. This strobe, as well as other strobes, that have been provided for use with such cameras utilize a low voltage battery supply together with a voltage converter circuit for charging a storage capacitor to a relatively high voltage suitable for discharge through a flash tube to provide an illuminating flash of light. The time required for the converter to charge the capacitor to the required voltage is generally of such long duration that the photographer must first turn on a power control switch to energize the electronic flash device and then wait for the voltage converter to charge the storage capacitor to the required voltage before the camera can be actuated to provide a photographic exposure cycle. The photographer is generally made aware of when the electronic flash device reaches a satisfactory charge condition by the turning on of a ready light which signals him that he may now proceed with the actual camera exposure. The time during which the photographer must wait for the electronic flash device to become fully charged prior to actuating the camera shutter button thus presents an obvious disadvantage to the electronic flash in comparison with an ordinary flash lamp.

Most recently, a fast charging strobe has been disclosed in U.S. patent application Ser. No. 930,863, supra, which substantially shortens the time which the photographer must wait for the electronic flash device to become fully charged. The charge time delay is sufficiently short that the capacitor may be fully charged in the minute time delay between the initiation of the photographic exposure and the actual commencement of the exposure interval as occurs in such cameras as Polaroid's SX-70 model.

Therefore, it is a primary object of this invention to provide an electronic flash device wherein the photographer is not required to first turn on the power to the strobe voltage converter and then wait for the strobe capacitor to become fully charged as a precondition to commencing the photographic operation.

It is a further object of this invention to provide an electronic flash device which does not require any time to charge a primary storage capacitor and therefore may be used in the manner of an ordinary flash lamp.

It is another object of this invention to provide an electronic flash device for use with SX-70 Land Cameras and other such cameras wherein the electronic flash device may be ready to flash from the instant that the photographer first depresses the photographic cycle initiating button.

Other objects of the invention will in part be obvious and will in part appear hereinafter. The invention accordingly comprises the mechanism and system processing the construction, the combination of elements and the arrangement of parts which are exemplified in the following detailed disclosure.

SUMMARY OF THE INVENTION

An electronic flash unit of the type powered by a generally steady state battery voltage is provided for use with a camera of the type which provides a flash fire trigger signal at an appropriate interval during a photographic exposure interval. The flash unit comprises a housing; a flash discharge tube; and a trigger circuit means responsive to the flash fire trigger signal from the camera for effecting a discharge of the steady state battery voltage through the flash discharge tube. Gating means are connected in series relation with respect to the flash discharge tube for controlling the time duration of the discharge from the steady state battery voltage through the discharge tube. The gating means is in a generally conductive state upon the triggering of the flash tube and thereafter switches to a generally nonconductive state subsequent to the expiration of a time delay of sufficient duration for the flash tube to provide a select amount of exposure influencing artificial illumination.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrative embodiment when read in connection with the accompanying drawings or when like numbers have been employed in the different figures to note the same parts and wherein:

FIG. 1 is a perspective view of the electronic flash device and camera arrangement of this invention; and FIG. 2 is a schematic diagram of the circuit for electronic flash device of FIG. 1.

DESCRIPTION OF THE PREFERRED EMBODIMENT

Referring now to FIG. 1, there is shown generally at 11 an automatic single lens reflex photographic camera sold by Polaroid Corporation, Cambridge, Mass., under the trademark "SX-70." Such cameras have highly automated systems for controlling photographic exposure and processing operations in a manner as is more fully described in U.S. Pat. No. 3,791,278, entitled "Photographic Apparatus with Solenoid Powered Instrumentalities," by C. Biber, issued Feb. 12, 1974 and U.S. Pat. No. 3,820,128, entitled "Flash Photographic Control System," by J. Burgarella, issued June 25, 1974. The automatic exposure control system described in the aforementioned patents are actuated to control an automatic exposure cycle in a well-known manner upon the manual actuation of a photographic cycle initiating button as shown at 13.

The electronic flash device or strobe of this invention is shown generally at 10 and may be formed either as an integral part of the camera 11 or alternatively may be made as a detachable accessory if so desired. The electronic flash device 10 comprises an electronic firing circuit as schematically shown in FIG. 1. The circuit is powered by a steady stage voltage source preferably comprising a flat multicell battery 12 characterized by both a low internal impedance as well as a high current discharge rate as will be subsequently described.

The flat multicell battery 12 may preferably comprise a plurality of series connected cells having a multiplicity of electrically conductive layers which include, for each cell, a positive electrode layer, a negative electrode layer, and an electrolyte containing layer disposed between and separating the positive and negative electrodes. Adjacent cells of the battery may be electrically connected one to the other by means of an electrolyte impervious intercell connector layer which is disposed between and in contacting relationship with each pair of adjacent cells. The flat multicell battery may thus be provided with a minimized internal impedance as well as a capability for a high discharge rate.

The multicell flat battery 12 is preferably manufactured in accordance with the teaching of U.S. Pat. No. 4,119,770, entitled "Electrical Cells and Batteries" by E. H. Land, issued Oct. 10, 1978 in common assignment herewith, and comprises multiple serially stacked flat cells providing an output steady state voltage of 70 VDC with an internal impedance in the order of 1 ohm.

The battery 12 is directly connected, preferably by way of a switch $S_1$, to discharge through a flash discharge tube 14 to provide an illuminating flash of light upon the triggering of the flash tube by a series trigger circuit as shown generally at 16. The flash discharge tube 14 preferably has a relatively low internal impedance, preferably below the internal impedance of the battery. The switch $S_1$ is preferably closed in synchronism with the manual actuation of a photographic cycle initiating button 13. Alternatively, switch $S_1$ may be closed independently of button 13. The trigger circuit 16 comprises a pulse transformer 18 having primary and secondary windings 20 and 22 respectively. The secondary winding 22 is preferably connected in series to a decoupling diode 24. The secondary winding 22 and diode 24 are, in turn, shunted by two serially connected diodes, 26 and 28, to define a trigger pulse circuit connected in serial relation to the flash discharge tube 14. Each diode 26 and 28, preferably has a peak inverse voltage characteristic of 1,500 V for reasons which will become apparent from the following discussion.

The primary winding 20 is grounded at one end with the other end connected in serial relation to a capacitor 30 which, in turn, is charged by the battery 12 through a resistor 32. The junction between the capacitor 30 and the resistor 32 is connected to the anode of an SCR 34, and the cathode of the SCR 34, in turn, is connected to a flash firing circuit 36 by way of a terminal 40. The flash firing circuit 36 is preferably part of an exposure control system of the automatic camera 11 and is fully described in U.S. Pat. No. 3,820,128, supra. The gate of the SCR 34 is also connected to the flash firing circuit 36 by way of another terminal 38 so as to receive a flash fire signal at the appropriate interval during an exposure interval in a manner as is fully described in U.S. Pat. No. 3,820,128, supra.

In the case where the electronic flash device 10 is made detachable from the automatic camera 11 in order to facilitate the use of an ordinary flash lamp array in place of the electronic flash device, there may be provided a resistor 42, between the gate and cathode of the SCR 34, having an impedance selected to correspond with the impedance value of an unfired flash lamp for reasons which are fully described in U.S. Pat. No. 3,858,227, supra. Alternatively, it may be desirable to provide a voltage monitoring circuit for monitoring the steady state voltage of the battery 12 and to provide a signal to the terminals 38 and 40 to enable the camera exposure control system, by way of the flash firing circuit 36, to conduct an automatic exposure cycle only if the battery output voltage is above a minimum value in a manner as is fully described in U.S. Pat. No. 4,064,519, entitled "Regulated Strobe for Camera with Sixth Flash Inhibit," by R. Kee, issued Dec. 20, 1977.

A gating circuit, as shown generally at 44, is provided in series relation with respect to the flash discharge tube 14 to control the time duration of the discharge from the battery 12 through the discharge tube 14. The gating circuit 44 is in a generally conductive stage upon the triggering of the flash tube 14 and thereafter switches to a generally nonconductive stage subsequent to the expiration of a time delay of sufficient duration for the flash tube 14 to provide a select amount of exposure influencing artificial illumination.

More specifically the gating circuit 44 preferably comprises a VMOS power FET having drain (D) and source (S) terminals connected in series relation with respect to the flash discharge tube 14, and a gate (G) terminal connected to a gate control circuit 48 for providing a gating signal to the gate terminal to effect conduction between the drain (D) and source (S) terminals. The gate control circuit may comprise a scene light detecting and integrating circuit of the type described in U.S. Pat. No. 4,008,481 entitled "Exposure Control System with Separate Flash and Ambient Trigger Levels," by G. Whiteside, issued Feb. 15, 1977 in common assignment herewith. As will be readily understood, the aforementioned scene light detecting and integrating circuit may be either integral to flash device 10 or to the camera 11 to which the flash device 10 is intended to connect and operates to switch off the gating signal to the gate (G) terminal to effect a nonconductive condition between the drain (D) and source (S) terminals upon detection and integration of a sufficient amount of incident scene light to effect a select exposure. Alternatively, the gate control circuit 48 may comprise an ordinary timing circuit to effect a flash discharge of predetermined time duration.

Operation of strobe arrangement of FIG. 1 may proceed as follows. In order to commence an electronic flash illuminated photographic exposure cycle, the photographer manual actuates the button 13 which immediately closes the switch $S_1$ and simultaneously commences the automatic exposure cycle of the camera in the manner disclosed in U.S. Pat. No. 3,820,128, supra, while simultaneously connecting the 70 VDC output of the battery 12 across the trigger circuit 16 and flash tube 14. In this manner, the electronic flash device 10 is automatically made ready for firing without the conscious effort of the photographer first turning on the power to the strobe and then waiting for the strobe to become fully charged before initiating the camera photographic cycle as heretofore required. Thus, the electronic device 10 acquires the ease of operation normally attributable to an ordinary flash lamp without the added expense of providing a new flash lamp for each exposure.

Subsequent to the commencement of the exposure interval, the flash fire circuit 36 provides a gating pulse in a manner as disclosed in U.S. Pat. No. 3,820,128, supra, to gate the SCR 34 into conduction. As is now readily apparent, closure of the switch $S_1$ also operated to substantially charge the capacitor 30 to 70 VDC prior to the gating of the SCR 34 into conduction. Thus, gating the SCR 34 into conduction operates to ground its anode terminal and thereby apply a triggering pulse to the primary winding 20 of the transformer 18. The triggering pulse, in turn, is stepped up by the transformer 18 to a peak voltage in the order 3 KV which pulse in then applied by way of the decoupling diode 24 to trigger the flash tube 14 into conduction. Once conducting, the primary discharge current through the flash tube 14 is provided directly from the battery 12 by way of the shunting diodes 26 and 28. As is readily apparent, the primary winding 20 is phased with respect to the secondary winding 22 to apply a triggering pulse to the discharge tube 14 of opposite polarity to that of the battery 12 discharge through the flash tube 14. Thus, the triggering pulse provided by the transformer 18 is of opposite plurality of that of the discharge current from the battery 12 through the shunting diodes 26 and 28 as is described in U.S. Pat. No. 3,475,651, entitled "Charging and Triggering Circuits for Pulse Electrical Devices Such as Flash Lamps," by G. Harding et al, issued Oct. 28, 1969.

In this manner, the flash tube 14 is triggered to discharge the battery 12 at the appropriate instant during the photographic exposure interval in order to provide an illuminating flash of light. Since the battery 12 requires no charging time immediately prior to its discharge through the flash tube 14, there are no losses due to leakage from a primary storage capacitor. The gate circuit 44 thereafter operates in the foregoing manner subsequent to the detection and integration of a sufficient amount of incident scene light to effect a select exposure to switch off the gating signal to the gate terminal (G) and thereby render the VMOS Power FET 46 nonconductive. Because of the relatively high internal impedance of the battery 12, as compared to the flash tube 14, flash discharge times in the order of 10–20 millisec., are required to provide useful light outputs. Batteries of the aforementioned type have been found capable of providing multiple flashes in the above-mentioned manner without suffering significant loss in steady state output voltage level.

Although the electronic flash device 10 has been herein described for use with the SX-70 camera, it will be ready appreciated that the electronic flash device 10 may also be used with other types of cameras.

Since certain changes may be made in the above described system and apparatus without departing from the scope of the invention herein involved, it is intended that all matter contained in the description thereof or shown in the accompanying drawings shall be interpreted as illustrative and not in a limiting sense.

What is claimed is:

1. An electronic flash unit of the type powered by a battery without the use of a primary storage capacitor, said flash unit comprising:

a housing;

a flash discharge tube;

trigger circuit means responsive to an applied flash fire trigger signal for effecting a discharge of the battery voltage directly through said discharge tube; and gating means connected in series relation with respect to said flash discharge tube for controlling the time duration of said discharge from the battery voltage through said discharge tube, said gating means being in a generally conductive state upon the triggering of said flash tube and thereafter switching to a generally nonconductive state subsequent to the expiration of a time delay of sufficient duration for said flash tube to provide a select amount of artificial illumination.

2. The electronic flash unit of claim 1 wherein said gating means comprises a MOS Power FET having drain and source terminals connected in series relation with respect to said flash discharge tube and a gate terminal connected to gate control means for providing a gating signal to said gate terminal to effect conduction between said drain and source terminals for a time period of sufficient duration for said flash tube to provide said select amount of artificial illumination.

3. The electronic flash unit of claim 2 wherein said gate control means comprises a scene light detecting and integrating circuit which switches off said gating signal to said gate terminal to effect a nonconductive condition between said drain and source terminals upon detection and integration of a select amount of incident scene light.

4. The electronic flash unit of claim 1 wherein said trigger circuit means includes a transformer having a primary winding connected to receive an input voltage pulse responsive to the flash fire trigger signal and a secondary winding connected in series relation with respect to said flash discharge tube and having a phase relationship with respect to said primary winding so as to apply a triggering pulse to said discharge tube of opposite polarity to that of the battery discharge through said flash tube, said trigger circuit means additionally including at least one diode connected in parallel shunting relation with respect to said secondary winding such that said triggering pulse operates to reverse bias said diode while said discharge through said flash tube operates to forward bias said diode.

5. The electronic flash unit of claim 1 wherein the battery voltage is provided by a low impedance flat multicell battery.

6. The electronic flash unit of claim 5 wherein the internal impedance of said flash discharge tube is lower than the internal impedance of the battery.

7. The electronic flash unit of claim 1 further comprising a battery having an internal impedance in the order of 1 ohm.

* * * * *